United States Patent
Chen et al.

(10) Patent No.: US 11,054,209 B2
(45) Date of Patent: Jul. 6, 2021

(54) TWO-WHEEL BALANCING VEHICLE

(71) Applicant: SZ DJI TECHNOLOGY CO., LTD., Shenzhen (CN)

(72) Inventors: Yiqi Chen, Shenzhen (CN); Fang Liu, Shenzhen (CN); Zihan Wei, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/683,733

(22) Filed: Nov. 14, 2019

(65) Prior Publication Data
US 2020/0096281 A1 Mar. 26, 2020

Related U.S. Application Data

(63) Continuation of application No. PCT/CN2017/091272, filed on Jun. 30, 2017.

(51) Int. Cl.
*F41A 23/30* (2006.01)
*B25J 9/16* (2006.01)
(Continued)

(52) U.S. Cl.
CPC .............. *F41A 23/30* (2013.01); *B25J 9/162* (2013.01); *B25J 11/002* (2013.01);
(Continued)

(58) Field of Classification Search
CPC .......... F41A 23/30; B25J 9/162; B25J 11/002; B25J 19/008; F41H 7/005; G05D 1/0891
(Continued)

(56) References Cited

U.S. PATENT DOCUMENTS 7,509,904 B2 * 3/2009 Plumier ................. F41A 23/24
89/41.05
7,962,243 B2 * 6/2011 Deguire ............... G05D 1/0038
700/259
(Continued)

FOREIGN PATENT DOCUMENTS

CN 204536772 U 8/2015
CN 105984541 A 10/2016
(Continued)

OTHER PUBLICATIONS

The World Intellectual Property Organization (WIPO) International Search Report for PCT/CN2017/091272 dated Apr. 9, 2018 11 pages.

*Primary Examiner* — Joshua E Freeman
(74) *Attorney, Agent, or Firm* — Anova Law Group, PLLC

(57) ABSTRACT

A two-wheel balancing vehicle includes a chassis including one or more mounting interfaces configured to detachably mount one or more fighting modules for robotic competition. The two-wheel balancing vehicle also includes two wheel assemblies respectively mounted at a left side and a right side of the chassis. Each of the two wheel assemblies includes a wheel and a driving motor drivingly connected with the wheel and mounted to the chassis. The two-wheel balancing vehicle also includes an inertial measurement unit. The two-wheel balancing vehicle further includes a control system communicatively connected with the inertial measurement unit and the driving motor, the control system configured to receive sensing signals provided by the inertial measurement unit and to control a balancing state of the two-wheel balancing vehicle. The inertial measurement unit and the control system are mounted to the chassis.

16 Claims, 2 Drawing Sheets

(51) Int. Cl.
*B25J 11/00* (2006.01)
*B25J 19/00* (2006.01)
*F41H 7/00* (2006.01)
*G05D 1/08* (2006.01)

(52) U.S. Cl.
CPC .......... *B25J 19/0008* (2013.01); *F41H 7/005* (2013.01); *G05D 1/0891* (2013.01)

(58) Field of Classification Search
USPC ...................................................... 89/37.08
See application file for complete search history.

(56) References Cited

U.S. PATENT DOCUMENTS

| | | | | |
|---|---|---|---|---|
| 8,041,456 | B1* | 10/2011 | Blackwell | B25J 9/1674 |
| | | | | 700/245 |
| 8,106,616 | B1* | 1/2012 | Theobald | B62D 55/065 |
| | | | | 318/568.2 |
| 8,414,043 | B2* | 4/2013 | Albin | B25J 15/0213 |
| | | | | 294/106 |
| 8,731,720 | B1* | 5/2014 | Blackwell | B25J 9/162 |
| | | | | 700/259 |
| 9,216,612 | B2* | 12/2015 | Zdrahal | B60B 11/02 |
| 9,464,856 | B2* | 10/2016 | Lung | F41A 27/08 |
| 9,568,267 | B2* | 2/2017 | Lung | F41A 9/34 |
| 9,975,258 | B2* | 5/2018 | Wiley | B25J 5/007 |
| 10,406,854 | B2* | 9/2019 | Zhang | B60B 19/003 |
| 10,414,039 | B2* | 9/2019 | Meeker | B25J 19/023 |
| 10,471,589 | B2* | 11/2019 | Meeker | B62D 55/084 |
| 10,493,617 | B1* | 12/2019 | Holson | B25J 5/007 |
| 10,556,630 | B1* | 2/2020 | Bingham | B62D 61/00 |
| 10,736,478 | B2* | 8/2020 | Sauer | A47L 9/02 |
| 10,814,480 | B2* | 10/2020 | Georgeson | F41A 31/02 |
| 10,821,796 | B2* | 11/2020 | Lagrandcourt | B62D 61/00 |
| 2005/0072843 | A1* | 4/2005 | Chladny | B62J 17/02 |
| | | | | 235/384 |
| 2007/0105070 | A1* | 5/2007 | Trawick | F41A 23/10 |
| | | | | 434/11 |
| 2007/0205241 | A1* | 9/2007 | Mourao | F16M 11/24 |
| | | | | 224/401 |
| 2008/0083344 | A1* | 4/2008 | Deguire | F42B 33/00 |
| | | | | 102/262 |
| 2008/0105481 | A1* | 5/2008 | Hutcheson | B60L 15/20 |
| | | | | 180/209 |
| 2008/0121097 | A1* | 5/2008 | Rudakevych | F41A 19/58 |
| | | | | 89/28.05 |
| 2009/0030339 | A1* | 1/2009 | Cheng | A61B 8/0841 |
| | | | | 600/562 |
| 2009/0281660 | A1* | 11/2009 | Schmidt | F41H 13/00 |
| | | | | 700/258 |
| 2010/0263524 | A1* | 10/2010 | Morin | F41A 23/34 |
| | | | | 89/27.12 |
| 2011/0000363 | A1* | 1/2011 | More | F41H 7/005 |
| | | | | 89/43.01 |
| 2011/0005847 | A1* | 1/2011 | Andrus | F41A 23/34 |
| | | | | 180/9.1 |
| 2011/0106339 | A1* | 5/2011 | Phillips | G01C 21/20 |
| | | | | 701/2 |
| 2013/0000473 | A1* | 1/2013 | Schvartz | F41A 9/29 |
| | | | | 89/33.2 |
| 2013/0327205 | A1* | 12/2013 | Mons | F41H 5/20 |
| | | | | 89/36.13 |
| 2017/0008579 | A1* | 1/2017 | Wiley | B62D 61/06 |
| 2019/0339046 | A1* | 11/2019 | Herrmann | F41J 5/06 |
| 2020/0148295 | A1* | 5/2020 | Krinkin | B60D 1/01 |

FOREIGN PATENT DOCUMENTS

| | | |
|---|---|---|
| CN | 106002915 A | 10/2016 |
| CN | 205686537 U | 11/2016 |
| CN | 106184531 A | 12/2016 |
| CN | 106625569 A | 5/2017 |

* cited by examiner

TWO-WHEEL BALANCING VEHICLE

CROSS-REFERENCE TO RELATED APPLICATION

This application is a continuation application of International Application No. PCT/CN2017/091272, filed on Jun. 30, 2017, the entire contents of which are incorporated herein by reference.

TECHNICAL FIELD

The present disclosure relates to the technology field of robots and, more particularly, to two-wheel balancing vehicles.

BACKGROUND

As the advancement of technology and economy, competition-type robots are becoming more and more popular in consumers. Currently available competition-type robots or education-type robots all use four wheels to drive the competing vehicles. The competing vehicle may include a chassis and a front bridge disposed under the front portion of the chassis, a rear bridge disposed under the rear portion of the chassis. By driving the front bridge, the rear bridge, or both simultaneously, the competing vehicle may be driven to move forwardly, turn, or move backwardly. The current four-wheel-drive competing vehicles can move relatively steadily, and are not intended to overturn. However, the current four-wheel-drive competing vehicles are bulky in size, and turning is not agile.

SUMMARY

In accordance with an aspect of the present disclosure, there is provided a two-wheel balancing vehicle including a chassis comprising one or more mounting interfaces configured to detachably mount one or more fighting modules for robotic competition. The two-wheel balancing vehicle also includes two wheel assemblies respectively mounted at a left side and a right side of the chassis. Each of the two wheel assemblies includes a wheel and a driving motor drivingly connected with the wheel and mounted to the chassis. The two-wheel balancing vehicle also includes an inertial measurement unit. The two-wheel balancing vehicle further includes a control system communicatively connected with the inertial measurement unit and the driving motor, the control system configured to receive sensing signals provided by the inertial measurement unit and to control a balancing state of the two-wheel balancing vehicle. The inertial measurement unit and the control system are mounted to the chassis.

According to the technical solutions of the present disclosure, the structure of the two-wheel balancing vehicle has a small structure, which enables the two-wheel balancing vehicle to flexibly move in a competition arena, or to pass through a narrow field. By providing a mounting interface at the chassis of the two-wheel balancing vehicle, a fighting module may be quickly attached to or detached from the chassis, thereby enabling fast assembling of a response team to be deployed to the competition battle field. As a result, the challenge and interestingness of the competition may be enhanced.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

LIST OF ELEMENTS

Figure 1:
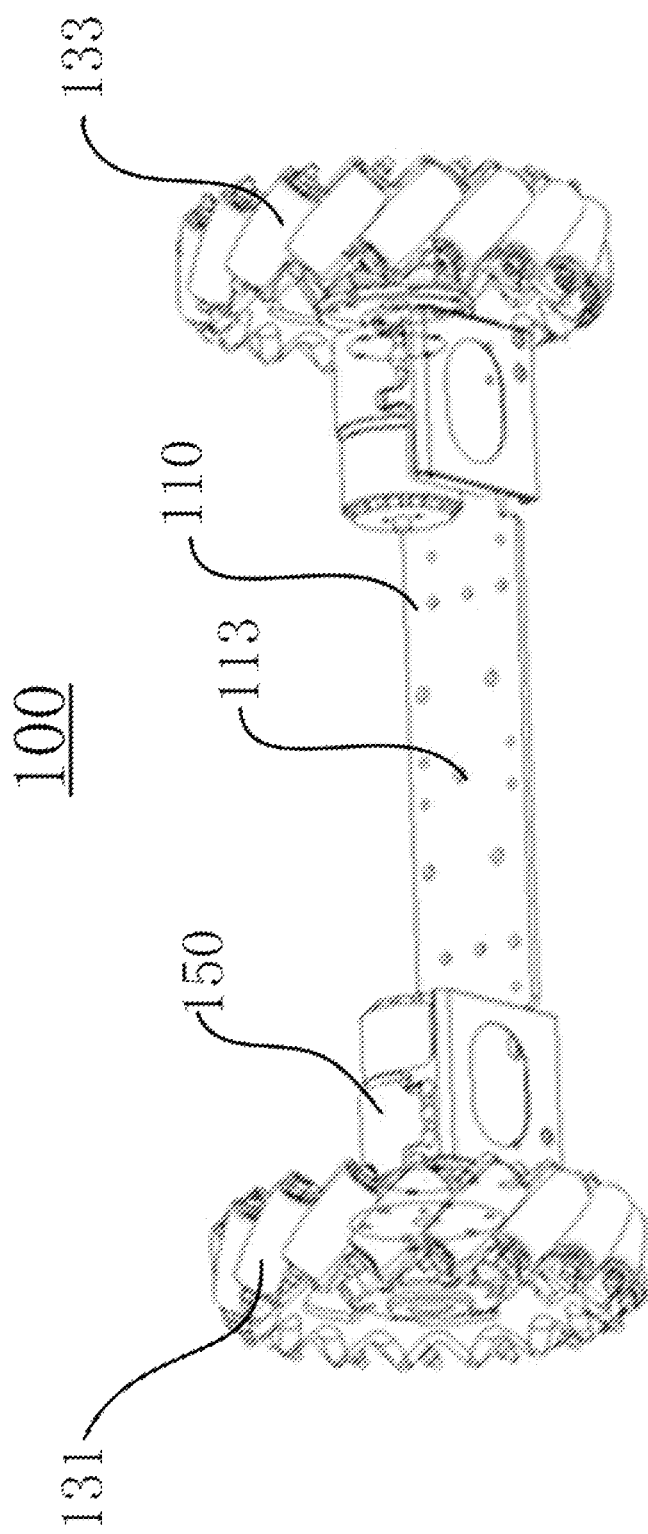
FIG. 1 is a schematic diagram of a structure of a two-wheel balancing vehicle, according to an example embodiment.

100: two-wheel balancing vehicle
110: chassis
113: mounting interface
131: left wheel
133: right wheel
150: driving motor
200: shooting module
210: mounting shaft
230: ammunition storage box
250: launcher
270: pitch motor
280: yaw motor
290: friction wheel

DETAILED DESCRIPTION OF THE EMBODIMENTS

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "vertical," "left," "right," "up," "upward," "upwardly," "down," "downward," "downwardly," and similar expressions used herein are merely intended for describing relative positional relationship.

In addition, the singular forms "a," "an," and "the" are intended to include the plural forms as well, unless the context indicates otherwise. The terms "comprise," "comprising," "include," and the like specify the presence of stated features, steps, operations, elements, and/or components but do not preclude the presence or addition of one or more other features, steps, operations, elements, components, and/or groups. The term "and/or" used herein includes any suitable combination of one or more related items listed. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C. In this regard, A and/or B can mean at least one of A or B. The term "module" as used herein includes hardware components or devices, such as circuit, housing, sensor, connector, etc. The term "communicatively couple(d)" or "communicatively connect(ed)" indicates that related items are coupled or connected through a communication channel, such as a wired or wireless communication channel.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

FIG. 1 is a schematic illustration of a structure of a two-wheel balancing vehicle. As shown in FIG. 1, the two-wheel balancing vehicle 100 may include a chassis 110, two wheel assemblies, an inertial measurement unit (not shown in figure), and a control system (not shown in figure).

The chassis 110 may be configured to have a shape and structure based on actual needs. For example, the chassis 110 may be a rectangular metal plate, or a plastic box having four rounded corners. An upper surface of the chassis 110 may include a mounting interface 113, such that a fighting module for robotic competition may be detachably mounted to the mounting interface 113. In some embodiments, the fighting module for robotic competition may include one or more of a shooting module 200, a gimbal module (for mounting an imaging device), a sensor module (e.g., an infrared sensing module, a laser module), and a mechanical arm module (e.g., a mechanical claw for grabbing objects). When the fighting module for robotic competition is fixed to the mounting interface 113, the fighting module may be electrically connected to a power source detachably mounted to the chassis 110 through a power cable. In some embodiments, the mounting interface 113 may be provided with a power outlet, and the fighting module for competition may be provided with a plug that matches with the power outlet, such that the mounting interface 113 may provide power to the fighting module for competition.

As shown in FIG. 1, multiple mounting interfaces 113 may be provided on the chassis 110. The mounting interfaces 113 may be separately provided on a ceiling surface of the chassis 110. Thus, multiple different fighting modules for robotic competition may be mounted to the chassis 110 to realize different combinations of functions to satisfy different fighting demands. For example, the chassis 110 may be mounted with a shooting module and a gimbal module mounted with a camera, such that the two-wheel vehicle 100 may record, in real time, the environment of the battlefield while being engaged in a shooting fight. The captured images (including video images) may be displayed on a display device in real time, or may be played back to an operator or an audience after the competition is finished. This may improve the entertainability of the robotic competition. The spacing between two adjacent mounting interfaces 113 may be selectively set as 8 mm or any integer multiple of 8 mm. This may satisfy mounting demands for standardized modules, thereby realizing fast functions assembling and switch when the two-wheel balancing vehicle 100 is in a competition fighting.

A wheel assembly may include a wheel and a driving motor 150 that is drivingly connected with the wheel and fixed onto the chassis 110. The driving motor 150 may include two direct current electric motors configured to drive a left wheel 131 and a right wheel 133, respectively. The wheel may be a plastic or rubber wheel, or a Mecanum wheel. When the wheel is a Mecanum wheel, the omni direction performance of the two-wheel vehicle 100 may be improved, and the balancing state of the two-wheel vehicle 100 may be better controlled.

Referring to FIG. 1, the chassis 110 may be a metal plate. The two driving motors 150 may be fixed to a ceiling surface of the metal plate through motor mounting bases. The left wheel 131 may be drivingly connected with the driving motor 150 on the left side through a left wheel shaft. The right wheel 133 may be drivingly connected with the driving motor 150 on the right side through a right wheel shaft. In some embodiments, the chassis 110 may be a plastic box. The two driving motors 150 may be disposed within the empty chamber of the plastic box, and may be fixed to a bottom panel or a side wall of the box through motor mounting bases. On the left and right side walls of the box, through holes may be provided to receive the wheel shafts. The left wheel shaft may penetrate through the through hole provided on the left side wall and drivingly connect with the left wheel 131 and the driving motor 150 located at the left side. The right wheel shaft may penetrate through the through hole on the right side wall and drivingly connect with the right wheel 133 and the driving motor 150 located at the right side.

In some embodiments, the wheel shaft and the wheel may be separately provided, and may be fixed together through a suitable connecting structure, such as a key connection or a flange. In some embodiments, the wheel shaft and the wheel may be integrally formed as a single, integral piece.

The inertial measurement unit and the control system may be mounted on the chassis 110. For example, when the chassis 110 is a plastic plate, the inertial measurement unit and the control system may be mounted at a lower side of the plastic plate to avoid the inference of the rain or snow on the electric components and circuits, thereby maintaining the stability of the balancing function. When the chassis 110 is a metal box, the inertial measurement unit and the control system may be mounted within an empty chamber of the metal box, thereby protecting the inertial measurement unit and the control system from being knocked or damaged. It also provides protections against the inference of the rain or snow on the electric components and circuits, thereby increasing the life time of the two-wheel balancing vehicle 100.

The control system may be communicatively connected with the inertial measurement unit and the driving motor 150, and may be configured to control the balancing status of the two-wheel balancing vehicle 100 based on a sensing signal received from the inertial measurement unit. For example, the control system may be connected through cables with the inertial measurement unit and the driving motor 150. In some embodiments, the control system may be wirelessly connected with the inertial measurement unit and the driving motor 150. In some embodiments, the control system may be connected with one of the inertial measurement unit and the driving motor 150 through a cable, and with another one of the inertial measurement unit and the driving motor 150 through a wireless connection. In some embodiments, the control system may be communicatively connected with the fighting module for robotic competition. In some embodiments, the control system may be connected with the fighting module for robotic competition through a wireless connection. In some embodiments, the control system may be connected with the fighting module for robotic competition through a cable. For example, the fighting module for robotic competition and the mounting interface 113 may each be provided with a matching connector for connection.

In some embodiments, the inertial measurement unit may include an accelerometer configured to measure an acceleration of the two-wheel balancing vehicle 100 and a gyroscope configured to measure an angular velocity of the two-wheel balancing vehicle 100. The balancing state of the two-wheel balancing vehicle 100 may be obtained through computation performed by the control system based on the acceleration and the angular velocity measured by the inertial measurement unit, i.e., whether the two-wheel balancing vehicle 100 is in a balanced state, a tilted state, or a state in which the two-wheel balancing vehicle 100 completely falls to the ground. When the two-wheel balancing vehicle 100 is tilted or completely falls to the ground, the control system may control an operating parameter of the driving motor 150 to restore the two-wheel balancing vehicle 100 back to the balanced state. In some embodiments, the operating parameter of the driving motor 150 may include one or more of a turning direction, a rotation speed, and an acceleration.

The principle for the two-wheel balancing vehicle 100 to maintain balance will be briefly explained below, so as to better understand the disclosed technical solutions.

A vertical axis running through the overall enter of gravity of the shooting module 200 mounted to the chassis 110 and the vehicle is used as a reference axis. If the reference axis tilts forward, the gyroscope of the inertial measurement unit may measure a change in the angular velocity, and the accelerometer may measure a change in the acceleration. A torque caused by the shooting module 200 and the vehicle tilting forward may be obtained through computation. The control system may control the driving motors of the two-wheel balancing vehicle 100 to generate a force that drives the vehicle forwardly, and to generate an acceleration to cause the vehicle to move forwardly, so as to balance the torque caused by the forward tilting of the shooting module 200 and the vehicle. Conversely, when the inertial measurement unit detects that the center of gravity of the shooting module 200 tilts backwardly, the control system may generate a force that drives the vehicle backwardly to achieve the same balancing effect.

The two-wheel vehicle 100 of the present disclosure has a small structure, which enables the two-wheel balancing vehicle 100 to flexibly move in a competition arena, or to pass through a narrow field. The chassis 110 of the two-wheel balancing vehicle 100 is provided with the mounting interface 113, which enables fast attaching and detaching of the fighting module for robotic competition to the chassis 110, thereby fast assembling of a response team to be deployed to the competition battle field. As a result, the challenge and interestingness of the competition may be enhanced.

Figure 2:
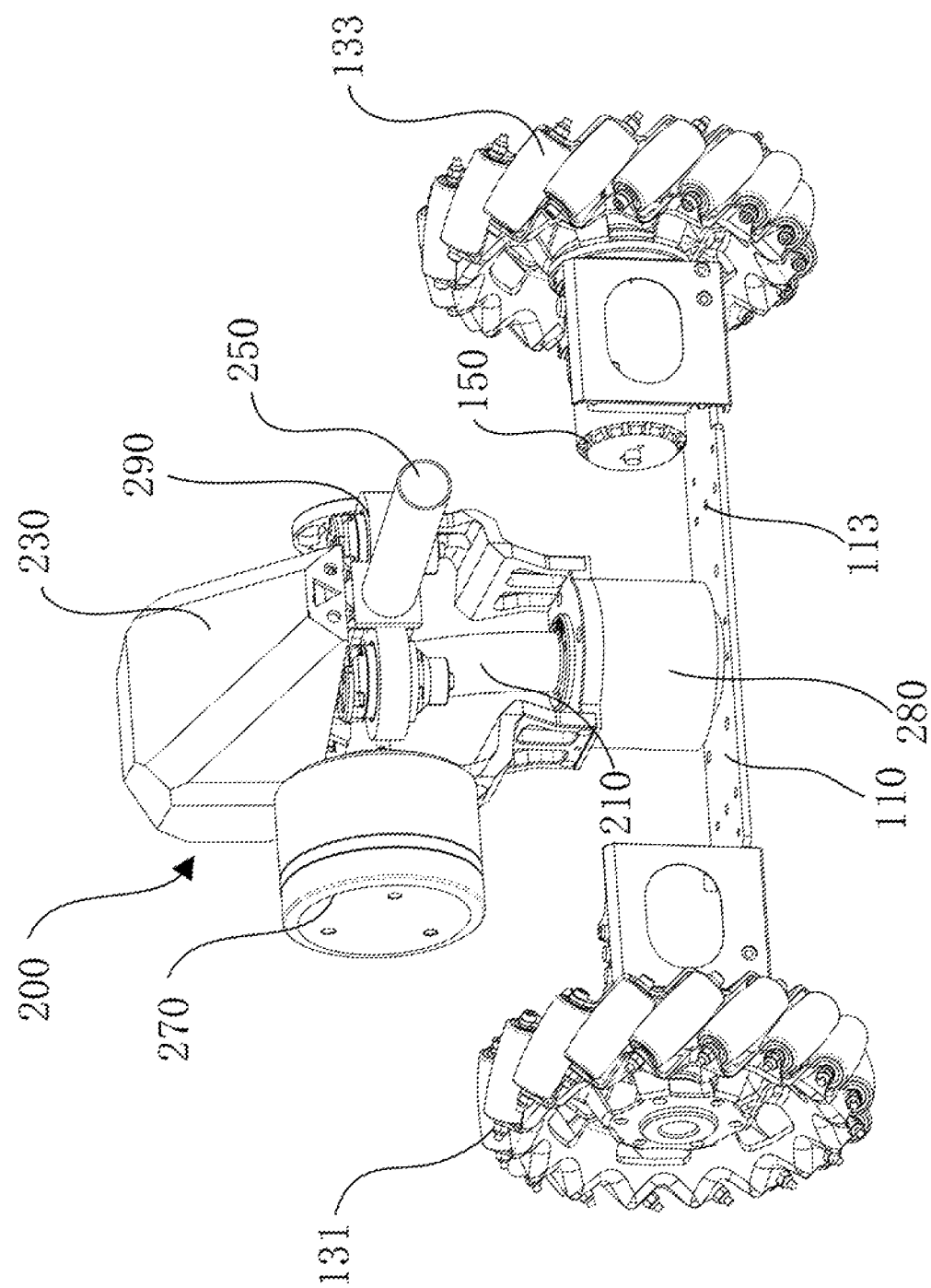
FIG. 2 is a schematic diagram of the structure of the two-wheel balancing vehicle having a shooting module mounted thereon, according to an example embodiment.

FIG. 2 is the two-wheel vehicle mounted with the shooting module. As shown in FIG. 2, an optional structural form of the shooting module 200 mounted to the two-wheel balancing vehicle 100 is illustrated. The shooting module 200 may include a mounting shaft 210, an ammunition storage box 230, and a launcher 250.

The mounting shaft 210 may be detachably mounted inside the mounting interface 113. For example, the mounting shaft 210 may be fixed in the mounting interface 113 through a bolt or a snap-fit connecting mechanism. In some embodiments, the mounting shaft 210 may have a hollow structure to reduce the weight of the shooting module 200, which in turn reduces the difficulty of controlling the balance of the two-wheel balancing vehicle 100. When the mounting shaft 210 has a hollow structure, communication control cables for communicatively connecting the shooting module 200 and the control system may be disposed in the empty chamber of the mounting shaft 210. In some embodiments, the power cable for connecting the shooting module 200 and the power source mounted to the chassis may be disposed in the empty chamber of the mounting shaft 210.

The ammunition storage box 230 may be fixed to the mounting shaft 210. As shown in FIG. 2, the ammunition storage box 230 may be fixed to an end of the mounting shaft 210, which makes it favorable to design the center of gravity of the entire shooting module 200. In some embodiments, the bullets may be light-weight plastic bullets, such as BB bullets, or may be rubber bullets, painted eggshells, or other types of bullets.

The launcher 250 may be rotatably mounted on the mounting shaft 210. The launcher 250 may be connected with the ammunition storage box 230 through conduits. The launcher 250 and the ammunition storage box 230 may be separately provided. When compared to the launcher 250 and the ammunition storage box 230 being integrally provided, the separate configuration may have the advantage of reducing the weight and improving the flexibility and efficiency when adjusting the launching structure. By rotating the launcher 250 in a perpendicular plane, that is, by adjusting the pitch angle of the launcher 250, the height of the shooting exit port of the launcher 250 may be adjusted to aim at different targets. Changing the pitch angle of the launcher 250 may also assist in controlling the forward moving, backward moving, or acceleration of the two-wheel balancing vehicle 100.

Adjusting the pitch angle of the launcher 250 may be performed manually. In some embodiments, to automatically control the pitch angle of the launcher 250, a pitch motor 270 may be provided. The pitch motor 270 may be drivingly connected with the launcher 250. The pitch motor 270 may be electrically connected with a power source of the two-wheel balancing vehicle 100 through a power cable.

The pitch motor 270 may be communicatively connected with the control system of the two-wheel balancing vehicle 100 through a control cable. The control system may control the rotation speed, rotation direction, and acceleration of the pitch motor 270 to adjust the pitch angle of the launcher 250 based on actual needs. In some embodiments, the pitch motor 270 may be directly controlled by an external remote control system to adjust the pitch angle of the launcher 250. When the launching module includes an internal power source, the pitch motor 270 may receive power from the internal power source, and may not receive power from the power source of the two-wheel balancing vehicle 100.

In some embodiments, to control the yaw angle of the launcher 250, the launcher 250 may be configured to be rotatable relative to the chassis 110 around an axis of the mounting shaft 210 in a plane parallel with the chassis 110. In some embodiments, yaw angle may be adjusted manually or automatically. For example, a yaw motor 280 may be provided. The yaw motor 280 may be drivingly connected with the mounting shaft 210, and may dive the mounting shaft 210 to rotate in the mounting interface 113. Inner threads may be provided in an inner wall of a hole of the mounting interface 113. A bottom end of the mounting shaft 210 may be provided with external threads. The mounting shaft 210 may rotate in the mounting interface 113 to adjust the yaw angle of the launcher 250. Correspondingly, the yaw motor 280 may be electrically connected with the power source of the two-wheel balancing vehicle 100 through a power cable, and may be communicatively connected with the control system of the two-wheel balancing vehicle 100 through a control cable. The control system may control the rotation speed, the rotation direction, and the acceleration of the yaw motor 280 to adjust the yaw angle of the launcher 250. In some embodiments, the yaw motor 280 may be directly controlled by an external remote control system to adjust the yaw angle of the launcher 250. When the launching module has an internal power source, the yaw motor 280 may use the internal power source, and may not receive power from the power source of the two-wheel balancing vehicle 100. Adjusting the yaw angle may assist in adjusting the velocity and direction of the two-wheel balancing vehicle 100.

In some embodiments, to achieve a suitable shooting speed, the shooting module 200 may include two friction wheels 290. The two friction wheels 290 may be provided on two sides of a shooting entry port of the launcher 250 opposing each other. A launching channel for launching the bullet may be formed between the two friction wheels 290. The friction wheels 290 may squeeze the bullet to increase the initial velocity of the bullet when entering the launcher 250, thereby increasing the shooting velocity. The two friction wheels 290 may also be configured to adjust the launching route, such that each bullet may travel along the same route from the shooting entry port to the shooting exit port. The detailed configuration of the two friction wheels 290 and the friction factor of the bullets may be designed based on the shooting requirement, which is not limited in the present disclosure.

In some embodiments, the two-wheel balancing vehicle 100 may include a referee system (not shown in figure) configured to sense signals indicating that the two-wheel balancing vehicle 100 has been attacked by other two-wheel balancing vehicle 100 or other fighting vehicles. In some embodiments, the referee system may include an armor mounted on the two-wheel balancing vehicle 100. Pressure sensors may be distributed on the armor to sense attacking signals when the armor is under attack, such as the attacking intensity, the attacking location, and the attacking type, etc. In some embodiments, the attacking intensity may be distinguished based on different pressure intensity sensed by the pressure sensors. The attacking location may be determined based on the multiple pressure sensors distributed at different locations. The attacking type may be determined based on the number of pressure sensors distributed at different locations that have sensed the attack.

The control system and the referee system may be communicatively connected through a wired or wireless connection. The control system may receive sensing signals from the referee system, such as signals indicating the attacking intensity, attacking location, and attacking type measured by the pressure sensors. When the control system receives the sensing signals from the referee system, the control system may transmit an alarm command to an alarm system or an alarm device, which may provide an alarm. In some embodiments, the alarm device may provide the alarm through sound, light, or electric indicators, or any other suitable form. For example, a lamp column for indicating an amount of "blood" of the two-wheel balancing vehicle 100 may be provided on a display screen of the two-wheel balancing vehicle 100 or on an external display screen. When the pressure sensors sense the attack, the signals indicating the attacking intensity, attacking location, and attacking type may be transmitted to the control system. The control system may process the signals indicating the attacks and may send a command to the lamp column to adjust at least one of a brightness, color, or length of the lamp strip of the lamp column, thereby providing an alarm. The lamp column may also indicate that the two-wheel balancing vehicle 100 has been attacked, and the degree of damages.

In some embodiments, to enhance the competitiveness, when the control system receives the sensing signals from the referee system, the control system may analyze the sensing signals to determine the degree of attack the two-wheel balancing vehicle 100 has suffered. Based on the degree of attack suffered by the two-wheel balancing vehicle 100 and sensing signals provided by the inertial measurement unit, the control system may control the tilting of the two-wheel balancing vehicle 100 to intuitively show that the two-wheel balancing vehicle 100 has been attacked.

In some embodiments, when the control system receives the sensing signals from the referee system, the control system may analyze the attacking location, attacking intensity, and attacking type included in the sensing signals, calculate a damage value cause by the attack, and obtain a tilting direction and tilting angle of the two-wheel balancing vehicle 100 based on the damage value. The control system may also calculate a first operating parameter including the rotation speed, the rotation direction, or the acceleration of the driving motor 150 when the two-wheel balancing vehicle 100 is at the tilting direction and the tilting angle. Based on the attitude of the two-wheel balancing vehicle 100 detected by the inertial measurement unit, the control system may calculate a second operating parameter including the rotation speed, the rotation direction, and the acceleration of the driving motor 150 when the two-wheel balancing vehicle 100 is at the detected attitude. A third operating parameter of the driving motor 150 may be obtained by adding the first operating parameter with the second operating parameter. The control system may control the driving motor 150 based on the third operating parameter, such that the degree of damages suffered by the two-wheel balancing vehicle 100 matches the tilting direction and the tilting angle. As such, when the two-wheel balancing vehicle 100 suffers a relatively small damage, the two-wheel balancing vehicle 100 may tilt in a corresponding direction a small angle. When the two-wheel balancing vehicle 100 suffers a fatal damage, the control system may control the two-wheel balancing vehicle 100 to completely fall onto the ground or floor.

The above describes a method in which when the referee system senses that the two-wheel balancing vehicle 100 is attacked, the control system actively controls the two-wheel balancing vehicle 100 to tilt toward a predetermined direction for an angle that matches the degree of damages. The above-described method is for illustration only. Other methods may also be used. For example, in some embodiments, a degree of damage may be calculated based on sensing signals received when the two-wheel balancing vehicle 100 is attacked. The tilting angle may be determined based on the degree of damage. The angle may be used as a basis for defining a new reference line as the center of gravity vertical axis. The two-wheel balancing vehicle 100 may use the new reference line as a base line of dynamic balancing, and may control the driving motor based on existing balancing methods to adjust the center of gravity of the two-wheel balancing vehicle 100 to the location of the new reference line. The process of controlling the two-wheel balancing vehicle 100 to tilt based on the damage value may be realized using other existing methods.

In some embodiments, from the "full blood" state of the two-wheel balancing vehicle 100 to the "blood depleted" state of the two-wheel balancing vehicle 100, the tilting angle may accumulate after each attack. That is, after each attack, the two-wheel balancing vehicle 100 may be controlled to move closer to the ground, until the two-wheel balancing vehicle 100 completely falls to the ground when the "blood" is depleted. Alternatively, after each attack, the two-wheel balancing vehicle 100 may be controlled to tilt for a corresponding angle. After a predetermined time period has lapsed, the two-wheel balancing vehicle 100 may be controlled to restore balancing through the inertial measurement unit. In other words, the first operating parameter of the inertial measurement unit is no longer added to the second operating parameter of the inertial measurement unit.

The above describes various advantages of the disclosed technical solutions while explaining the various embodiments. It should be understood that other embodiments may also include such advantages. Not all of the descriptions of the various embodiments have expressly explained the advantages. All of the advantages that are inherent with the technical features of the various embodiments should all be deemed as advantages of the disclosed technical solutions, and should all fall within the scope of protection of the present disclosure.

Other embodiments of the present disclosure will be apparent to those skilled in the art from consideration of the specification and practice of the embodiments disclosed herein. It is intended that the specification and examples be considered as example only and not to limit the scope of the present disclosure, with a true scope and spirit of the invention being indicated by the following claims. Variations or equivalents derived from the disclosed embodiments also fall within the scope of the present disclosure.

What is claimed is:

1. A two-wheel balancing vehicle, comprising:
    a chassis comprising one or more mounting interfaces configured to detachably mount one or more fighting modules for robotic competition;
    two wheel assemblies respectively mounted at a left side and a right side of the chassis, each of the two wheel assemblies comprising a wheel and a driving motor drivingly connected with the wheel and mounted to the chassis;
    an inertial measurement unit; and
    a control system communicatively connected with the inertial measurement unit and the driving motor, the control system configured to receive sensing signals provided by the inertial measurement unit and to control a balancing state of the two-wheel balancing vehicle, wherein:
    the inertial measurement unit and the control system are mounted to the chassis;
    the fighting module for robotic competition comprises one or more of a shooting module, a gimbal module, a sensor module, and a mechanical arm module; and
    the shooting module comprises:
        a mounting shaft configured to detachably mount in the mounting interface;
        an ammunition storage box configured to mount to the mounting shaft and to store bullets;
        a launcher configured to rotatably connect with the mounting shaft and to launch the bullets; and
        two friction wheels provided on two sides of a shooting entry port of the launcher opposing each other, wherein:
        the ammunition storage box and the launcher are connected through a conduit; and
        a launching channel for launching the bullets is formed between the two friction wheels.

2. The two-wheel balancing vehicle of claim 1, wherein the control system is configured to control an operating parameter of the driving motor to control the balance state of the two-wheel balancing vehicle, the operating parameter of the driving motor comprises one or more of a rotation speed, a rotation direction, and an acceleration.

3. The two-wheel balancing vehicle of claim 1, wherein the balance state of the two-wheel balancing vehicle comprises: a balanced state, a tilted state, or a state in which the two-wheel balancing vehicle completely falls to the ground.

4. The two-wheel balancing vehicle of claim 1, wherein the one or more mounting interfaces comprise a plurality of mounting interfaces separately provided at a ceiling surface of the chassis.

5. The two-wheel balancing vehicle of claim 4, wherein a spacing between two adjacent mounting interfaces among the plurality of mounting interfaces is 8 mm or an integer multiple of 8 mm.

6. The two-wheel balancing vehicle of claim 1,
    wherein the shooting module further comprises a pitch motor configured to drivingly connect with the launcher, and
    wherein the pitch motor is configured to control the launcher to rotate relative to the mounting shaft to adjust a pitch angle of the launcher.

7. The two-wheel balancing vehicle of claim 1, wherein the launcher is configured to rotate relative to the chassis around an axis of the mounting shaft in a plane parallel with the chassis.

8. The two-wheel balancing vehicle of claim 7, wherein the shooting module further comprises a yaw motor configured to drivingly connect with the mounting shaft, and to control the launcher to rotate relative to the chassis to adjust a yaw angle of the launcher.

9. The two-wheel balancing vehicle of claim 1, wherein the wheel is a Mecanum wheel.

10. A two-wheel balancing vehicle, comprising:
a chassis comprising one or more mounting interfaces configured to detachably mount one or more fighting modules for robotic competition;
two wheel assemblies respectively mounted at a left side and a right side of the chassis, each of the two wheel assemblies comprising a wheel and a driving motor drivingly connected with the wheel and mounted to the chassis;
an inertial measurement unit;
a control system communicatively connected with the inertial measurement unit and the driving motor, the control system configured to receive sensing signals provided by the inertial measurement unit and to control a balancing state of the two-wheel balancing vehicle; and
a referee system configured to sense a signal indicating that the two-wheel balancing vehicle is under attack by another two-wheel balancing vehicle or another fighting vehicle,
wherein the inertial measurement unit and the control system are mounted to the chassis, and
wherein the control system is configured to:
control an operating parameter of the driving motor to control the balance state of the two-wheel balancing vehicle, the operating parameter of the driving motor comprising one or more of: a rotation speed, a rotation direction, and an acceleration; and
communicatively connect with the referee system, and to transmit an alarm signal to an alarming system based on a sensing signal received from the referee system.

11. The two-wheel balancing vehicle of claim 10, wherein the control system is configured to:
analyze the sensing signal received from the referee system to determine a degree of attack suffered by the two-wheel balancing vehicle; and
control the two-wheel balancing vehicle to tilt based on the degree of attack suffered by the two-wheel balancing vehicle and the sensing signal provided by the inertial measurement unit.

12. The two-wheel balancing vehicle of claim 11, wherein the degree of attack suffered by the two-wheel balancing vehicle comprises one or more of an attacking intensity, an attacking location, and an attacking type.

13. The two-wheel balancing vehicle of claim 11, wherein when the control system is configured to control the two-wheel balancing vehicle to tilt based on the degree of attack suffered by the two-wheel balancing vehicle and the sensing signal provided by the inertial measurement unit, the control system is further configured to:
determine a first operating parameter of the driving motor based on the degree of attack;
determine a second operating parameter of the driving motor based on the sensing signal of the inertial measurement unit;
add the first operating parameter with the second operating parameter to obtain a third operating parameter of the driving motor; and
control the driving motor based on the third operating parameter.

14. The two-wheel balancing vehicle of claim 11, wherein when the control system is configured to control the two-wheel balancing vehicle to tilt based on the degree of attack suffered by the two-wheel balancing vehicle and the sensing signal provided by the inertial measurement unit, the control system is further configured to:
obtain a tilting direction and a tilting angle of the two-wheel balancing vehicle based on the degree of attack suffered by the two-wheel balancing vehicle;
determine a center of gravity axis for tilting based on the tilting direction and the tilting angle of the two-wheel balancing vehicle; and
set the center of gravity axis as a reference line for dynamic balancing of the two-wheel balancing vehicle.

15. The two-wheel balancing vehicle of claim 10, wherein the control system is further configured to control the two-wheel balancing vehicle to restore balance based on a determination that a predetermined time period has lapsed after the two-wheel balancing vehicle is tilted.

16. The two-wheel balancing vehicle of claim 10, wherein the alarm system comprises a lamp column configured to adjust one or more of a brightness, color, or length of a lamp strip based on the alarm signal.

* * * * *